United States Patent
Evans et al.

[15] 3,656,530
[45] Apr. 18, 1972

[54] COMPOUNDING FLUOROCARBONS AND METHOD OF USING SAME

[72] Inventors: Theodore A. Evans, Akron; Robert M. Meck; Joseph E. Thibodeau, both of Cuyahoga Falls, all of Ohio

[73] Assignee: The Goodyear Tire & Rubber Company, Akron, Ohio

[22] Filed: Dec. 19, 1968

[21] Appl. No.: 785,388

[52] U.S. Cl. ............................150/0.5, 161/189, 161/227, 220/83, 244/135 B, 260/80.77, 260/92.1, 280/5 R
[51] Int. Cl. ................ B64d 37/02, B60p 3/22, B65d 89/00
[58] Field of Search ..........................260/87.7, 92.1, 80.77; 161/189, 227; 220/83; 280/5 R, 5 A; 244/135 B; 150/0.5

[56] References Cited

UNITED STATES PATENTS

| | | | |
|---|---|---|---|
| 3,129,014 | 4/1964 | Hutchison et al. | 150/0.5 X |
| 3,272,373 | 9/1966 | Alleaume et al. | 220/9 |
| 3,409,253 | 11/1968 | Berg et al. | 244/135 |
| 3,510,142 | 5/1970 | Erke | 150/0.5 X |
| 3,511,515 | 5/1970 | Cline et al. | 280/5 |
| 3,550,839 | 12/1970 | Clayton | 150/0.5 X |
| 3,522,125 | 7/1970 | Talbott et al. | 161/189 X |
| 2,405,986 | 8/1946 | Sullivan | 161/227 X |
| 2,440,965 | 5/1948 | Merrill et al. | 161/227 |
| 2,687,977 | 8/1954 | Gerke | 161/227 X |
| 2,754,992 | 7/1956 | Wilson | 244/135 X |
| 2,816,055 | 12/1957 | Semegen et al. | 161/227 |
| 2,944,995 | 7/1960 | Dosmann et al. | 260/87.7 X |
| 2,973,293 | 2/1961 | Schofield | 161/227 X |
| 3,080,336 | 3/1963 | Smith | 260/80.77 X |
| 3,080,347 | 3/1963 | Sandberg et al. | 260/80.77 |
| 3,389,749 | 6/1968 | Towns et al. | 161/189 X |
| 3,502,498 | 3/1970 | Petriello et al. | 161/189 X |

*Primary Examiner*—Harold Ansher
*Attorney*—F. W. Brunner and J. D. Wolfe

[57] ABSTRACT

This invention relates to a composition of a fluorocarbon and a curative belonging to the class of organic peroxy compounds, organic amines and Schiff's base with 1 to 25 parts of an alkaline earth metal oxide and 1 to 50 parts of red iron oxide, and further relates to the use of this composition on a polyamide fabric to form containers, and to said containers.

7 Claims, No Drawings

3,656,530

COMPOUNDING FLUOROCARBONS AND METHOD OF USING SAME

This invention relates to a composition of fluorohydrocarbons having improved properties over a wide range of temperatures. More particularly, this invention relates to compounding and curing fluorohydrocarbons to obtain compositions that can be flexed over a wide temperature range of from a very cold to a relatively high temperature while coated on a polyamide fiber which preferably does not melt and has high temperature resistance, and to structures made of said material.

Although polyurethane coated nylon fabric flexible fuel cells or tanks are used currently in airplanes, they are inadequate in some respects for use in supersonic aircraft such as the F-111 or the proposed SST because the material of construction used in making these fuel cells are reaching their operational limits as the temperature exceeds about 250° F.

Therefore, it is an object of this invention to provide an elastomeric material suitable for construction of fuel cells, related containers and other articles which are capable of withstanding temperatures relatively hot and relatively cold.

The objects of this invention can be achieved by compounding fluorohydrocarbons with suitable compounding agents as hereinafter described and curing, preferably in a circulating hot air oven or by use of a vacuum blanket vulcanization technique, the compounded fluorohydrocarbon, preferably as a coating on a nylon fiber which preferably does not melt. These preferred cure techniques yield a cured product that is more resistant to low temperature cracking than those cured by other methods. In accordance with this invention the fluorocarbon is compounded with red iron oxide, a suitable curative and process aids, where so desired, to obtain improved low temperature cured properties.

The fluorocarbons useful in this invention are the highly halogenated chain polymers whose structure is composed substantially exclusively of carbon, hydrogen and halogen atoms and are reacted at elevated temperatures with an organic peroxy compound which is stable against decomposition below about 50° C., and with a basic metal compound, to produce a cross-linked polymer. It is preferred that the chain polymers be at least half fluorinated and that $-CH_2-$ groups be present. In other words, at least some of the carbon atoms on the chain should be bonded only to hydrogen atoms and other carbon atoms.

Chain polymers with a minor degree of disorder in their molecules are generally more thermoplastic in nature than those without such disorder. Elasticity requires a greater degree of disorder. In order to obtain an elastomeric product, at least 10 percent of the carbon atoms in the structure must be of the type which are bonded only to hydrogen atoms and other carbon atoms. Ordinarily, a mono-olefinic compound containing a $CH_2 =$ group is used to provide these carbon atoms, and this results in chains containing $-CH_2-$ groups. Ordinarily, such a mono-olefinic compound is copolymerized with another highly fluorinated mono-olefin to help give the polymer molecule its highly fluorinated nature.

Among the highly fluorinated mono-olefins which may be used as comonomers are: $CF_2 = CFCl$, $CF_2 = CCl_2$, $CF_3 — CF = CF_2$, $CF_2 = CHCl$, $CF_3 — CCl = CCl — CF_3$, $CF_3 = CHF$, $CF_3 — CH = CH — CF_3$ (cis or trans), $CF_2 = CF_2$,

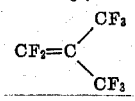

$CF_2 = CFBr$, $CF_2 = CCl — CF_3$, $CF_3 — CH = CH_2$ and $CF_3 — CCl = CCl_2$.

Among the hydrogen containing mono-olefins which may be used as comonomers with the above highly fluorinated mono-olefins are: $CF_2 = CH_2$, $CFH = CH_2$, $CH_2 = CH_2$, $CFCl = CH_2$, $CCl_2 = CH_2$, $CClH = CH_2$, $CHBr = CH_2$ and

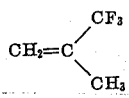

Of these, the most advantageous combinations are: $CF_2 = CFCl/CF_2 = CH_2$, $CF_2 = CF_2/CF_2 = CH_2$, $CF_2 = CF_2/CH_2 = CFCl$, and $CF_2 = CFBr/CF_2 = CH_2$.

The aforementioned mono-olefins may be copolymerized in any proportions, depending on the characteristics desired. Good chemical stability requires fluorine substitution at at least one-half of the possible positions for such substitution in the polymer chain.

It is to be noted that all of the monomers enumerated above contain only carbon, hydrogen and halogen atoms and, therefore, produce copolymers substantially without markedly reactive functional groups. This, of course, does not preclude the presence of other atoms in end groups which might be formed by chain stoppers in the polymerization zone, present by design or by accident. Such end groups are relatively few in number and are difficult to detect. They do not, in any way, affect the characteristics of the polymer to any noticeable degree.

Specific examples illustrative of this invention are disclosed as follows with all parts and percentages being by weight unless otherwise indicated.

EXAMPLE I

Specimens containing 100 parts of a commercial elastomeric terpolymer of vinylidene fluoride, hexafluoropropylene and tetrafluoroethylene with 15 parts magnesium oxide, and 3.0 parts of N,N'-dicinnamylidene-1,6-hexanediamine were compounded with 0 and 7.0 parts of red iron oxide respectively. This compounded elastomer (Viton B) was then cured 60 minutes at 300° F. and then given a post cure for 24 hours at 420° F. The physical properties of these post-cured compounded elastomers are compared in Table 1:

TABLE 1

| Physical Properties | | Iron oxide compounded parts/100 | |
|---|---|---|---|
| | | 0.0 | 7.0 |
| Tensile, psi | | | |
| test temp. | −70°F. | 6,632 | 7,088 |
| | 77°F. | 2,666 | 3,278 |
| | 418°F. | 243 | 250 |
| Elongation, % | | | |
| test temp. | −70°F. | 49 | 91 |
| | 77°F. | 507 | 553 |
| | 418°F. | 106 | 126 |
| Shore Hardness | | | |
| test temp. | −70°F. | 85D | 86D |
| | 77°F. | 61A | 57A |
| | 418°F. | 48A | 52A |

Other specimens of the elastomer compounded as above with 0 and 7.0 parts respectively of red iron oxide per 100 of elastomer were soaked 96 hours at 165° F. in Type III Fluid (a mixture of 70 percent iso-octane and 30 percent toluene by volume). At the end of the soak period the samples were removed, dried and subjected to various physical tests. The results of these tests are shown in Table 2:

TABLE 2

| Tests | | Parts Iron oxide | |
|---|---|---|---|
| | | 0 | 7.0 |
| Tensile °F. | −70 | 4711 | 5154 |
| | 77 | 1250 | 1523 |
| | 418 | 186 | 378 |
| Elongation, % | −70°F. | 12 | 98 |
| | 77 | 234 | 430 |
| | 418 | 72 | 85 |
| Shore Hardness | −70°F. | 70D | 90A |
| | 77 | 54A | 60A |
| | 418 | 36A | 62A |
| Modulus 100% | −70°F. | 4762 | 5237 |
| | 77 | 181 | 209 |
| | 418 | — | 231 |
| Modulus 300% | 77°F. | 722 | 842 |
| Gauge | −77°F. | before after | before after |
| | | 0.070 0.074 | 0.073 0.075 |

This comparison of results on fuel soaked samples exemplifies the superiority of red iron oxide samples at both high and low temperatures.

EXAMPLE II

A fuel cell (tank) suitable for use in an airplane was built on a plaster of paris cube form 24" × 24" × 24" × on a side. A polyamide cloth made from fibers of the copolymer of meta phenylene diamine and isophthaloyl chloride was coated on a cement spreader with a 33 percent methyl ethyl ketone (MEK) solution of the compounded elastomer of Example I. The cloth was dried for 12 hours in a 300° F. circulating air oven prior to the coating operation. The coated fabric was built into a fuel container by laying the cloth up on the plaster form to give 1.5 inch lap seam and then cementing the seams with the MEK solvent solution of the coating material. The laid-up fabric container was placed in a hot air circulating oven at 140° F. for 12 hours to eliminate any solvent in the coating and then the temperature was raised to 200° F. and 250° F. in 20 minutes increments. Finally the container was cured at 300° F. for 60 minutes in a hot air oven. This cure was followed by a post cure at 420° F. for 24 hours to enhance the adhesion of the coating to the fabric. The container was removed from the plaster form by destruction of the form and washing the plaster from the container as chips or a slurry. The finished container was subjected to hot and cold fuel tests and passed these tests.

EXAMPLE III

A fluorocarbon elastomer, available commercially as Viton B, was compounded according to recipes given in Table 3 and then the compounded samples were cured for 60 minutes at 300° F. Tensile specimens were cut from the cured sheets and then the tensile and elongation tests were run at the break point at temperatures of −70° F., 77° F. and 450° F. The results of these tests are shown in Table 4.

TABLE 3.—ELASTOMER COMPOUNDED

| Recipe numbers | 115 | 116 | 119 | 120 | 124 | 125 |
|---|---|---|---|---|---|---|
| Viton B | 100 | 100 | 100 | 100 | 100 | 100 |
| Magnesium-oxide * | 15 | 15 | 15 | 15 | 15 | 15 |
| Red iron oxide | 7 | 7 | 7 | 7 | 7 | 7 |
| N,N'-dicinnamylidene-1,6-hexanediamine | 3 | 3 | 3 | 3 | 3 | 3 |
| Polymerized castor oil | 5 | 10 | | | | |
| Methyl acetyl recinoleate | | | 5 | | | |
| Tetraethylene glycol diethyl ether | | | | 5 | 10 | |

* This magnesium oxide has a surface area of about 23 square millimeters per gram.

TABLE 4

[Original physical properties of cured elastomers compounded according to recipe of Table 3]

| Recipe numbers | Break tensile, p.s.i. | | | Elongation at break and hardness | | |
|---|---|---|---|---|---|---|
| | −70° | −77° | 450° | −70° | 77° | 450° |
| 115 | 5,691 | 1,838 | 170 | 41-86D | 504-61A | 127 |
| 116 | 5,727 | 1,360 | 156 | 63-74D | 495-59A | 137 |
| 119 | 5,108 | 1,562 | 177 | 16-79D | 462-51A | 135 |
| 120 | 4,433 | 1,806 | 192 | 15-70D | 614-44A | 163 |
| 124 | | 6,50 | 144 | | 319-54A | 76-48A |
| 125 | | 1,004 | 170 | | 399-55A | 91-52A |

EXAMPLE IV

To compare the effects of various compounding recipes on various commercial fluorocarbon elastomers, samples were compounded according to the recipe shown in Table 5 and formed into sheets. The sheets were cured for 60 minutes at 300° F. Tensile and elongation tests at the break point were run on these samples at −50, 77 and 450° F. The physical test data are shown in Table 6. From the physical test data in Tables 4 and 6, it will be noted that a small amount of plasticizer can be utilized to improve the tensile and elongation at relatively low temperatures on these cured polymers.

TABLE 5.—ELASTOMER COMPOUNDING RECIPES

| Recipe numbers | 109 | 110 | 111 | 112 | 113 | 147 | 148 | 149 | 151 | 152 | 153 | 161 |
|---|---|---|---|---|---|---|---|---|---|---|---|---|
| Viton A**** | 50 | 50 | | | | | | | | | | |
| Viton B | 50 | 50 | 100 | 100 | 100 | 95 | 90 | 80 | 95 | 90 | 80 | |
| Viton C-10* | | | | | | | | | | | | 100 |
| Dimethyl silicone polymer | | | | | | 5 | 10 | 20 | 5 | 10 | | |
| K-1014** | | | | | | | | | | | | |
| Magnesium-oxide*** | 15 | 15 | 15 | 15 | 15 | | | | | | 15 | 15 |
| Red iron oxide | 7 | 7 | 7 | 7 | 7 | | 7 | 7 | 7 | 7 | 7 | 7 |
| N,N'-dicinnamylidene-1,6-hexanediamine | 3 | 2 | 1.5 | 2 | 2.5 | | 4 | 4 | 4 | 4 | 4 | 2 |

*A lower molecular weight fluorocarbon elastomer having a Mooney viscosity, ML-10 at 212° F. of approximately 10.
**A silicone polymer manufactured by Union Carbide used as an extender or plasticizer.
***This magnesium oxide has a surface area of about 23 square millimeters per gram.
****Viton A is a copolymer of vinylidene fluoride and hexafluoropropylene.

TABLE 6

[Original physical properties of cured elastomers compounded with recipe of Table 5]

| Recipe numbers | Tensile, p.s.i. | | | Elongation and hardness | | |
|---|---|---|---|---|---|---|
| | −50° | 77° | 450° | −50° | 77° | 450° |
| 109 | 6,055 | 1,442 | 92 | 75-85D | 446-56A | 76 |
| 110 | 5,887 | 1,930 | 123 | 76-81D | 818-51A | 90 |
| 111 | 5,803 | 1,842 | 136 | 72-80D | 810-53A | 93 |
| 112 | 5,632 | 2,899 | 251 | 119-73D | 852-56A | 226 |
| 113 | 5,728 | 1,475 | 137 | 88-75D | 750-59A | 95 |
| 147 | 4,973 | 1,364 | 207 | 78-81D | 595-60A | 155 |
| 148 | 4,712 | 1,675 | 241 | 76-78D | 732-62A | 197 |
| 149 | 4,005 | 1,730 | 214 | 24-74D | 728-64A | 195 |
| 151 | 5,850 | 2,012 | 219 | 69-78D | 787-63A | 165 |
| 152 | 4,573 | 1,959 | 242 | 54-78D | 779-64A | 226 |
| 153 | 3,856 | 2,264 | 307 | 51-77D | 740-65A | 180 |
| 161 | 7,865 | 892 | 89 | 11-73D | 466-58A | 91 |

EXAMPLE V

In Table 7, Viton B, a commercial fluorocarbon elastomer, is compounded with varying amounts of red iron oxide and alkaline earth metal oxides such as magnesium oxide and calcium oxide and also some of the recipes use some carbon black. These compounded samples were cured for 60 minutes at 300° F. and test samples were cut from the cured samples and subjected to test conditions at −50, 77 and 450° F. The test results on the tensile and elongation at break, as well as hardness, is shown in Table 8 for these samples.

TABLE 7.—ELASTOMER COMPOUNDING RECIPE

| Recipe numbers | 136 | 137 | 138 | 139 | 140 | 141 | 142 | 143 | 114 |
|---|---|---|---|---|---|---|---|---|---|
| Viton B | 100 | 100 | 100 | 100 | 100 | 100 | 100 | 100 | 100 |
| Magnesium oxide* | | | | | 15 | 15 | 15 | 15 | 15 |
| Calcium oxide | 15 | 15 | 15 | 15 | | | | | |
| Red iron oxide | 7 | 7 | 7 | 7 | 10 | 10 | 3.5 | 2.5 | 7 |
| Carbon black MT | | | | | 10 | 10 | 10 | 10 | |
| N,N'-dicinnamylidene-1,6-hexanediamine | 1 | 2 | 3 | 4 | 3 | 2 | 3 | 2 | 2 |
| Carbon black FEF | | | | | | | | | 2 |

*This magnesium oxide has a surface area of about 23 square millimeters per gram.

TABLE 8
Original physical properties of cured elastomers compounded with recipe of Table 7

| Recipe numbers | Tensile, p.s.i. | | | Elongation and hardness | | |
|---|---|---|---|---|---|---|
| | −50° | 77° | 450° | −50° | 77° | 450° |
| 136 | 4,479 | 241 | ---- | 42-82D | 2,542-56A | ---- |
| 137 | 4,650 | 1,198 | 100 | 63-81D | 1,495-58A | 110-50A |
| 138 | 4,492 | 1,252 | 104 | 42-81D | 921-64A | 84-47A |
| 139 | 4,648 | 1,597 | 150 | 25-83D | 879-62A | 52-53A |
| 140 | 5,456 | 2,078 | 193 | 42-82D | 530-68A | 94-55A |
| 141 | 5,279 | 2,010 | 172 | 36-81D | 773-67A | 152-47A |
| 142 | 5,290 | 1,777 | 232 | 56-80D | 478-67A | 125-53A |
| 143 | 5,298 | 1,953 | 154 | 59-79D | 832-66A | 163-48A |
| 144 | 6,098 | 2,367 | 170 | 114-84D | 997-54A | 174-44A |

EXAMPLE VI

In Example VI, Viton B, was compounded with magnesium oxide in varying amounts of red iron oxide to study the effect of the red iron oxide level on the cured properties obtained. The results of this study is shown in Table 9. The results from Table 9 indicate that as little as 3 ½ parts and as high as 30 or even 50 parts of red iron oxide in the curing recipe yields fluorocarbon having an elongation of about 100 or more at 450° F.

TABLE 9
[Elastomer compounded with varying amounts of iron oxide]

| Recipe numbers | 8 | 9 | 10 | 11 | 12 | 13 | 14 | 15 |
|---|---|---|---|---|---|---|---|---|
| Viton B | 100 | | | | | | | |
| Magnesium oxide | 15 | | | | | | | |
| Red iron oxide | 7.0 | 7.0 | 3.5 | 3.5 | 20 | 20 | 30 | 30 |
| N,N'-dicinnamylidene-1,6-hexanediamine | 2.0 | 3.0 | 2.0 | 3.0 | 2.0 | 3.0 | 2.0 | 3.0 |
| Tensile: | | | | | | | | |
| −70° F | 5,496 | 5,886 | 5,448 | 6,175 | 7,084 | 7,205 | 8,119 | 8,735 |
| 77° F | 2,328 | 2,439 | 2,611 | 2,198 | 2,512 | 2,258 | 2,273 | 2,361 |
| 450° F | 199 | 232 | 163 | 199 | 231 | 273 | 168 | 333 |
| Elongation: | | | | | | | | |
| −70° F | 820 | 820 | 820 | 820 | 830 | 840 | 850 | 850 |
| 77° F | 1,145 | 735 | 1,060 | 686 | 1,006 | 626 | 914 | 564 |
| 450° F | 227 | 104 | 139 | 102 | 170 | 110 | 124 | 113 |
| Shore Hardness: | | | | | | | | |
| −70° F | 28D | 30D | 27D | 31D | 23D | 19D | 18D | 15D |
| 77° F | 65A | 68A | 65A | 67A | 67A | 70A | 68A | 72A |

Although for convenience of comparison the Schiff base N,N'-dicinnamylidene-1,6-hexanediamine was used, in most of the working examples other Schiff bases such as benzylaniline, the ketone reaction products of the aliphatic and aromatic diamines of about 1 to 20 carbon atoms, for instance, acetone, methyl ethyl ketone and hexylene diamine or phenylene diamine can be used, except care must be exercised to keep the elastomer relatively cool during the compounding to prevent premature curing or scorching. Likewise, the solid amines present this problem so it is preferred to use the lower molecular weight liquid amines as curatives. For example, the liquid tetraethylene pentamines, the diethylene triamines, and ethylene diamine are the preferred amine curatives as they are readily mixed with solvent solutions or cements of the fluorocarbon elastomers without premature curing.

Suitable solvents for the curatives and the elastomers are the liquid ketones such as acetone, methyl ethyl ketone, methyl isobutyl ketone, tetrahydrofuran, dimethylformamide and lower esters such as ethyl acetate.

EXAMPLE VII

To compare the effect of various curing agents a commercial fluorocarbon elastomer, Viton B, was compounded according to the recipe shown in Table 10 and the sheets were cured for 60 minutes at 300° F. Tensile specimens were cut from the cured sheets and tensile and elongation at the break point were determined on these samples at −70, 77 and 450° F. and the results of these test are recorded in Table 11.

TABLE 10
Elastomer Compounded With Peroxide

| Recipe Nos. | 91 | 93 | 106 | 107 |
|---|---|---|---|---|
| Viton B | 100 | 100 | 100 | 100 |
| Magnesium oxide* | 15 | 15 | 15 | 15 |
| Red Iron Oxide | 7 | 7 | 7 | 7 |
| N,N'-dicinnamylidene-1,6-hexane-diamine | 2 | | | |
| Benzoyl Peroxide | | | 4.2 | 3 |
| 2,4-Dichlorobenzoyl peroxide | 1.30 | | | |
| Dicumyl Peroxide | | 4 | | |

*This magnesium oxide has a surface area of about 23 square millimeters per gram.

TABLE 11
Original physical properties of cured Viton B compounds

| Recipe numbers | Tensile, p.s.i. | | | Elongation and hardness | | |
|---|---|---|---|---|---|---|
| | −70° | 77° | 450° | −70° | 77° | 450° |
| 91 | 8,739 | 2,889 | 242 | 36-83D | 925-60A | 195 |
| 93 | 6,358 | 2,425 | 231 | 25-84D | 711 | 185 |
| 106 | 5,766 | 2,562 | 189 | 26-88D | 794-57A | 147 |
| 107 | 5,454 | 2,144 | 167 | 31-87D | 768-56A | 151 |

The elongation of the organic peroxide samples are inferior to those obtained with N,N'-dicinnamylidene-1,6-hexanediamine curative.

The organic peroxides useful in this invention generally are hereinafter called polytertiary peroxide or peroxy compounds. The ditertiary peroxides can be represented by the general formula:

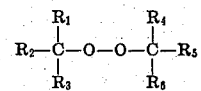

in which $R_1$, $R_2$, $R_3$, $R_4$, $R_5$ and $R_6$ are the same or different alkyl, cycloalkyl, cycloakenyl, aryl, substituted aryl, aralkyl hydrocarbon radical. The alkyl radicals can be straight chain or branched, saturated or unsaturated. Usually these radicals contain less than about 18 to 20 carbon atoms and preferably contain less than about 7 or 8 carbon atoms.

If one or more of the above R groups contains an additional peroxy group attached to a tertiary carbon atom then it is possible to have di- and tri-peroxy compounds which are useful in this invention. These di-peroxy compounds are illustrated by the following formula:

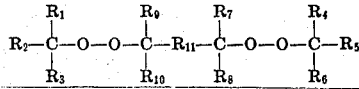

where $R_7$, $R_8$, $R_9$, $R_{10}$ and $R_{11}$ have the same meaning as that indicated for $R_1$ through $R_6$ in the above formula except $R_{11}$ is a divalent radical and the symbols of this formula which correspond to those of the first formula likewise have the same meaning as that indicated for the first formula.

Various polytertiary peroxides of the general formula shown above can be used in the practice of this invention. It is obvious that in selecting a peroxide for use in this invention the peroxide should be stable at the temperature of mixing of the elastomeric composition so that it can be mixed without decomposing and that the peroxide should decompose at a reasonable rate under the curing conditions used so that the resulting radicals can enter into the curing reactions. Representative examples of such peroxides are ditertiary-butyl peroxide; ditertiaryamyl peroxide; di(alpha, alph-dimethylbenzyl) peroxide (also known as dicumyl peroxide); di(alpha, alpha-dimethyl-p-chlorobenzyl) peroxide; di-(alpha, alpha-dimethyl-2,4-dichlorobenzyl) peroxide; tertiarybutyl-1-methylcyclohexyl peroxide; and peroxides formed by the oxidation of terpene hydrocarbons such as turpentine, alphapinene, para-methane and pinane.

In addition to the above ditertiary peroxides, $R_{11}$ in the formula for the diperoxy compound may also contain unsaturation wherein at least one pair of carbon atoms are joined by a double or a triple bond. Representative peroxides of the second formula type are 2,2-di-(tertiarybutylperoxy) butane; 2,5-ditertiary-butyl-peroxy-2,5-dimethylhexane; 2,5-ditertiary amylperoxy-2,5-dimethylhexane; 2,5-ditertiary-butyl peroxy-2,5-dimethyl-3-hexene and 2,5-ditertiary-butyl peroxy-2,5-dimethyl-3-hexyne. The preferred organic peroxides useful in this invention are dicumyl peroxide, available commercially as Di-Cup 40C and 2,5-ditertiary-butyl-peroxy-2,5-dimethylhexane, sometimes referred to herein as DBPH, available commercially as VAROX.

Some of the acetylenic polyperoxy compounds desirable for curing these fluorocarbon compositions are 2,5-dimethyl-2,5-di(peroxy ethyl carbamate) hexyne-3; 2,5-dimethyl-2,5-di(t-butyl-peroxy) hexyne-3; 3,6-dimethyl-3,6-di(t-butyl peroxy) octyne-4; 1,4-tetraphenyl-1,4-(t-butylperoxy) butyne-2.

The quantity of polytertiary peroxide used in general is at least about 0.5 percent by weight, based on the polymer with the preferred amount being about 1.0 to 4.0 percent. Normally, the use of more than about 6 percent of the polytertiary peroxides results in the cured polymer having physical properties that are poorer than the optimum values obtainable at lower peroxide levels. Hence, use of amounts in excess of about 6 percent, say for instance, more than 10 percent would not generally be desirable However, it should be appreciated that when reinforcing fillers such as the carbon blacks or silicas are used that the percent polytertiary peroxide used preferably will be higher than when no filler is present, i.e., when curing the so-called gum stocks. The amount of additional polytertiary peroxide used and required when fillers are present is to a certain extent a function of the amount of filler used. Hence, in some cases the amount of extra peroxide used will be about 1.5 to 3 times that required to cure the gum stock per se.

EXAMPLE VIII

A fluorocarbon elastomer, Viton B, 100 parts, was compounded according to the recipe of Example I and dissolved in sufficient methyl ethyl ketone (MEK) to give a cement of 33 percent solids. This cement was used in a cement spreader to coat a square woven polyamide fabric where the polyamide was the copolymer of meta-phenylene diamine and isophthaloyl chloride to give a coating thickness of 4 to 6 mils and 12 to 14 mils respectively. The fabric prior to being fed to the cement spreader was held for 1 hour at 300° F. to eliminate moisture and oils from the weaving and handling process. The coating on the fabric was built up about 3 mils per pass through the spreader and was dried 15 minutes in an air circulation chamber to remove the ketone. While the cement coating was still tacky a fluorocarbon film (Teflon FEP), a fluorinated ethylene propylene copolymer having a thickness of 1 to 16 mils was spread over the fabric containing the fluorocarbon coating and cured 60 minutes at 300° F. in a vacuum blanket with 85 p.s.i. back-up air pressure to laminate the film to the coated fabric. The cured fabric was cut into patterns and the fuel cell or bag assembled on the building table by cementing the seams with the MEK cement used to coat the fabric. Kraft paper was used to separate and keep the fabric sheets forming the top and the bottom of the bag from adhering together while spread on the building table. The finished bag was cured using one of the following curing techniques: an autoclave, a vacuum bag, or a hot air oven. Improved performance was obtained with the cells cured with a vacuum bag or a hot air oven.

Also, the cells made with a fuel barrier of 1 to 3 mils of a fluorocarbon film on the outside of the cell were superior to those where the barrier was on the inside of the cell or inner layer of a laminate. Also, a 2 mil thick barrier film was found to be better than a 5 mil one.

Thus, the above techniques of cell construction provides a fuel cell that withstands flexing at −50° F. and 450° F. The films of the fluorocarbon elastomers described above are particularly desirable as they permit the coating on the polyamide fiber to be thinner and thereby improve the flex life of the resulting laminate.

In addition to the fluorocarbon elastomers and films described in the examples, the copolymers of the advantageous monomer combinations set forth heretofore are particularly desired for use in this invention to form films and also for elastomers to be cured with red iron oxide, an alkaline metal oxide and curatives which cure at a temperature of at least 150° F. or higher by activation of the curative.

While certain representative embodiments and details have been shown for the purpose of illustrating the invention, it will be apparent to those skilled in this art that various changes and modifications may be made therein without departing from the spirit or scope of the invention.

We claim:

1. A container having a body portion formed of polyamide fabric having a coating of a fluorocarbon composition thereon and the seams between the edges of the fabric adhered together with a solvent solution of said fluorocarbon composition, the fluorocarbon composition comprising a chain-saturated polymer containing fluorine substitution of at least half the positions available for substitution and composed substantially exclusively of carbon, hydrogen and halogen atoms, 1 to 25 parts of a basic metal oxide per 100 parts of polymer, 1 to 50 parts of red iron oxide per 100 parts of polymer, a curative selected from the class consisting of
   1. an organic peroxy compound,
   2. an organic amine, and
   3. a Schiff's base.

2. The container of claim 1 wherein the basic metal oxide of the fluorocarbon composition is selected from the group consisting of calcium oxide and magnesium oxide.

3. The container of claim 2 wherein red iron oxide is used in amounts of 2 to 35 parts per hundred and the curative is a Schiff's base.

4. The container of claim 1 having a fluorocarbon film adhered to the fluorocarbon coating on the polyamide fabric.

5. The container of claim 4 wherein the film is 1 to 16 mils thick.

6. The container of claim 4 wherein the film is adhered to the coating on the outside of the fabric.

7. The container of claim 1 wherein the curative is an organic peroxy compound which is stable at a temperature below about 50° C. and in the presence of a basic metal oxide.

* * * * *